(12) United States Patent
Pao et al.

(10) Patent No.: US 11,902,812 B2
(45) Date of Patent: Feb. 13, 2024

(54) DEVICE AND METHOD OF HANDLING FLEXIBLE DUPLEXING

(71) Applicant: ACER INCORPORATED, New Taipei (TW)

(72) Inventors: Wei-Chen Pao, New Taipei (TW); Chien-Min Lee, New Taipei (TW); Chia-Wen Hsieh, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 23 days.

(21) Appl. No.: 17/232,125

(22) Filed: Apr. 15, 2021

(65) Prior Publication Data
US 2021/0235306 A1    Jul. 29, 2021

Related U.S. Application Data

(62) Division of application No. 16/057,836, filed on Aug. 8, 2018, now Pat. No. 11,012,879.

(Continued)

(51) Int. Cl.
*H04W 24/10*    (2009.01)
*H04L 5/14*    (2006.01)
(Continued)

(52) U.S. Cl.
CPC .......... *H04W 24/10* (2013.01); *H04B 17/318* (2015.01); *H04L 5/14* (2013.01);
(Continued)

(58) Field of Classification Search
CPC ..... H04B 17/318; H04L 5/001; H04L 5/0053; H04L 5/14; H04L 5/1469; H04W 24/10; H04W 72/1278
(Continued)

(56) References Cited

U.S. PATENT DOCUMENTS

| | | | | | |
|---|---|---|---|---|---|
| 11,064,434 | B2 * | 7/2021 | Lin | ................... | H04W 52/0206 |
| 11,368,275 | B2 * | 6/2022 | Moon | ............... | H04W 72/1263 |

(Continued)

FOREIGN PATENT DOCUMENTS

| | | |
|---|---|---|
| CN | 105850058 A | 8/2016 |
| TW | 201728207 A | 8/2017 |
| WO | 2011/162656 A1 | 12/2011 |

OTHER PUBLICATIONS

Huawei, HiSilicon, UE-to-UE measurement for cross-link interference mitigation, 3GPP TSG RAN WG1 NR Ad Hoc Meeting, R1-1709982, Qingdao, China, Jun. 27-30, 2017, XP051299207.

(Continued)

*Primary Examiner* — Robert J Lopata
(74) *Attorney, Agent, or Firm* — Winston Hsu

(57) ABSTRACT

A communication device for handling a measurement comprises at least one storage device; and at least one processing circuit coupled to the at least one storage device. The at least one storage device stores, and the at least one processing circuit is configured to execute instructions of: receiving information of a measurement set for at least one slot from a base station (BS), wherein the information comprises at least one of a measurement timing configuration of the measurement set and a measurement resource of the measurement set; and performing the measurement in the at least one slot according to the measurement set, to obtain a measurement result.

14 Claims, 19 Drawing Sheets

Related U.S. Application Data

(60) Provisional application No. 62/542,850, filed on Aug. 9, 2017.

(51) Int. Cl.
*H04W 72/20* (2023.01)
*H04B 17/318* (2015.01)
*H04L 5/00* (2006.01)

(52) U.S. Cl.
CPC ........... *H04L 5/1469* (2013.01); *H04W 72/20* (2023.01); *H04L 5/001* (2013.01); *H04L 5/0053* (2013.01)

(58) Field of Classification Search
USPC ........................................................ 370/252
See application file for complete search history.

(56) References Cited

U.S. PATENT DOCUMENTS

| | | | |
|---|---|---|---|
| 2014/0219244 A1 | 8/2014 | Prakash | |
| 2015/0181576 A1 | 6/2015 | Papasakellariou | |
| 2015/0372772 A1 | 12/2015 | Kim | |
| 2015/0373550 A1 | 12/2015 | Hong | |
| 2016/0007232 A1 | 1/2016 | Wang | |
| 2016/0020893 A1 | 1/2016 | Tong | |
| 2016/0227427 A1* | 8/2016 | Vajapeyam | H04W 24/00 |
| 2017/0019915 A1 | 1/2017 | Nogami | |
| 2017/0041122 A1 | 2/2017 | Li | |
| 2017/0289899 A1 | 10/2017 | You | |
| 2018/0220407 A1 | 8/2018 | Xiong | |
| 2018/0220421 A1 | 8/2018 | Zhang | |
| 2018/0302885 A1 | 10/2018 | Behravan | |
| 2019/0014576 A1 | 1/2019 | Liao | |
| 2019/0021045 A1* | 1/2019 | Kim | H04W 72/042 |
| 2019/0044664 A1 | 2/2019 | Takeda | |
| 2019/0109694 A1 | 4/2019 | Zhou | |
| 2019/0191381 A1 | 6/2019 | Zhang | |
| 2019/0200355 A1 | 6/2019 | Baldemair | |
| 2019/0246387 A1 | 8/2019 | Lee | |
| 2019/0349915 A1 | 11/2019 | Ahn | |
| 2019/0357224 A1 | 11/2019 | Li | |
| 2019/0363843 A1 | 11/2019 | Gordaychik | |
| 2020/0008232 A1 | 1/2020 | Takeda | |
| 2020/0059912 A1 | 2/2020 | Shen | |
| 2020/0077414 A1 | 3/2020 | Ye | |
| 2020/0213978 A1 | 7/2020 | Iyer | |
| 2020/0344034 A1* | 10/2020 | Moon | H04L 5/0098 |

OTHER PUBLICATIONS

Nokia, Alcatel-Lucent Shanghai Bell, Cross-link interference management based on Xn support, 3GPP TSG RAN WG1 NR Ad-Hoc#2, R1-17011313, Qingdao, P.R. China, Jun. 27-30, 2017, XP051300507.

CMCC, Considerations on Flexible Duplex in NR, 3GPP TSG RAN WG1 NR Ad-Hoc Meeting, R1-1700444, Spokane, USA, Jan. 16-20, 2017, pp. 1/1-3/1, XP051207977.

Huawei, HiSilicon, Scheduling scheme for slot aggregation, 3GPP TSG RAN WG1 NR Ad-Hoc Meeting, R1-1700026, Jan. 16-20, 2017, Spokane, USA, XP051202452.

* cited by examiner

DEVICE AND METHOD OF HANDLING FLEXIBLE DUPLEXING

CROSS REFERENCE TO RELATED APPLICATIONS

This application is a divisional application of U.S. application Ser. No. 16/057,836 filed on Aug. 8, 2018, which claims the benefit of U.S. Provisional Application No. 62/542,850 filed on Aug. 9, 2017.

BACKGROUND OF THE INVENTION

1. Field of the Invention

The present invention relates to a device and a method used in a wireless communication system, and more particularly, to a device and a method of handling a flexible duplexing.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

SUMMARY OF THE INVENTION

The present invention therefore provides a device and method for handling a flexible duplexing to solve the abovementioned problem.

A communication device for handling a measurement comprises at least one storage device; and at least one processing circuit coupled to the at least one storage device. The at least one storage device stores, and the at least one processing circuit is configured to execute instructions of: receiving information of a measurement set for at least one slot from a base station (BS), wherein the information comprises at least one of a measurement timing configuration of the measurement set and a measurement resource of the measurement set; and performing the measurement in the at least one slot according to the measurement set, to obtain a measurement result.

A method for handling a measurement comprises receiving information of a measurement set for at least one first slot from a base station (BS), wherein the information comprises at least one of a measurement timing configuration of the measurement set and a measurement resource of the measurement set; and performing the measurement in the at least one first slot according to the measurement set, to obtain a measurement result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
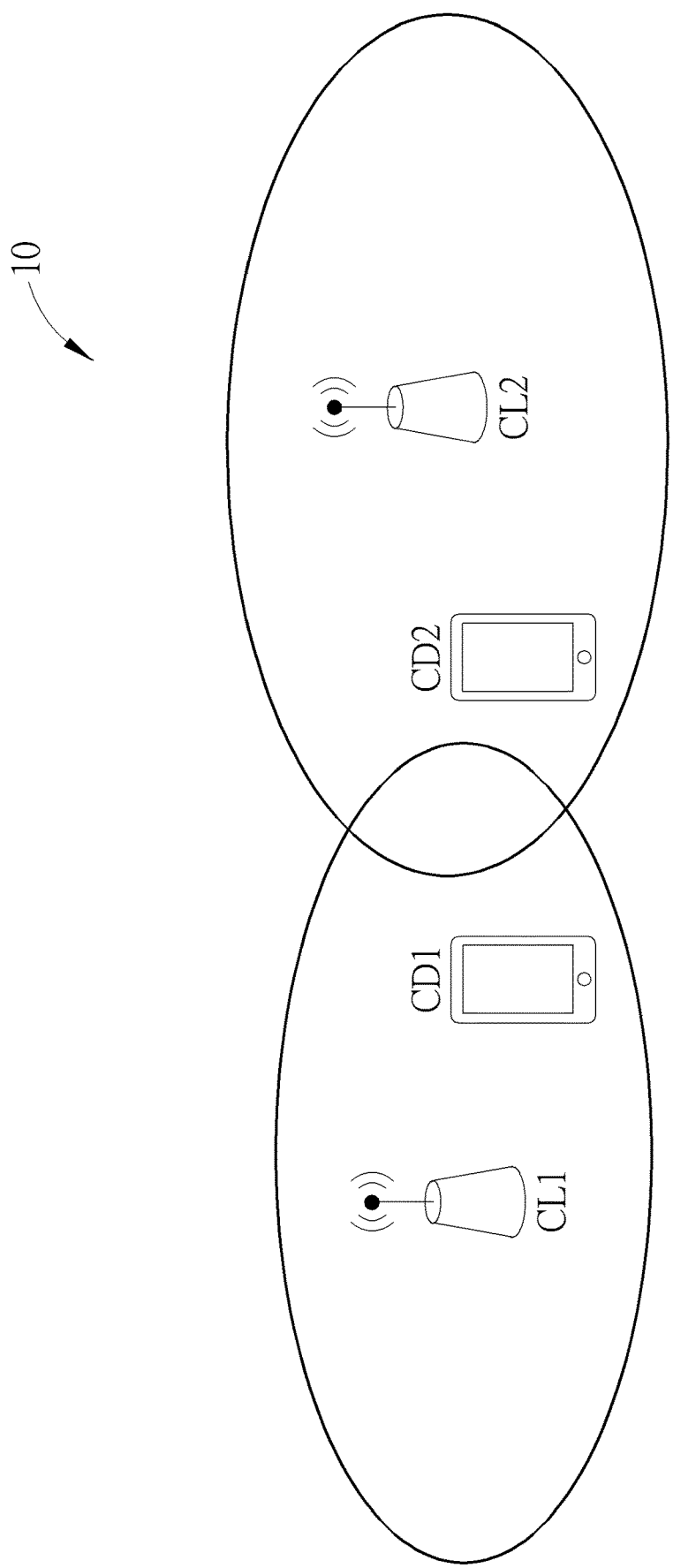
FIG. 1 is a schematic diagram of a wireless communication system according to an example of the present invention.

FIG. 1 is a schematic diagram of a wireless communication system 10 according to an example of the present invention. The wireless communication system 10 is briefly composed of cells CL1-CL2 and communication devices CD1-CD2. The wireless communication system 10 may support a time-division duplexing (TDD) mode, a frequency-division duplexing (FDD) mode, a TDD-FDD joint operation mode or a licensed-assisted access (LAA) mode. That is, the cell CL1 (or the cell CL2) and the communication device CD1 (or the communication device CD2) may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the cell CL1 (or the cell CL2) may be a primary cell (e.g., primary component carrier) or a secondary cell (e.g., secondary component carrier).

In FIG. 1, the cells CL1-CL2 and the communication devices CD1-CD2 are simply utilized for illustrating the structure of the wireless communication system 10. Practically, the cells CL1-CL2 may belong to a universal terrestrial radio access network (UTRAN) including at least one Node-B (NB) in a universal mobile telecommunications system (UMTS). In one example, the cells CL1-CL2 may belong to an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the cells CL1-CL2 may belong to a next generation radio access network (NG-RAN) including at least one next generation Node-B (gNB) and/or at least one fifth generation (5G) base station (BS). That is, a cell may be controlled/established by a BS which may be a NB, an eNB, a gNB or a 5G BS.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which mat billions of connected devices and/or sensors.

Furthermore, the cells CL1-CL2 may belong to a network include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT) device, a mobile phone, a laptop, a tablet computer, an electronic book, a portable computer system, or combination thereof. In addition, a cell (or a BS controlling it) and a communication device can be seen as a transmitter or a receiver according to direction (i.e., transmission direction), e.g., for an uplink (UL), the communication device is the transmitter and the cell is the receiver, and for a downlink (DL), the cell is the transmitter and the communication device is the receiver.

Figure 2:
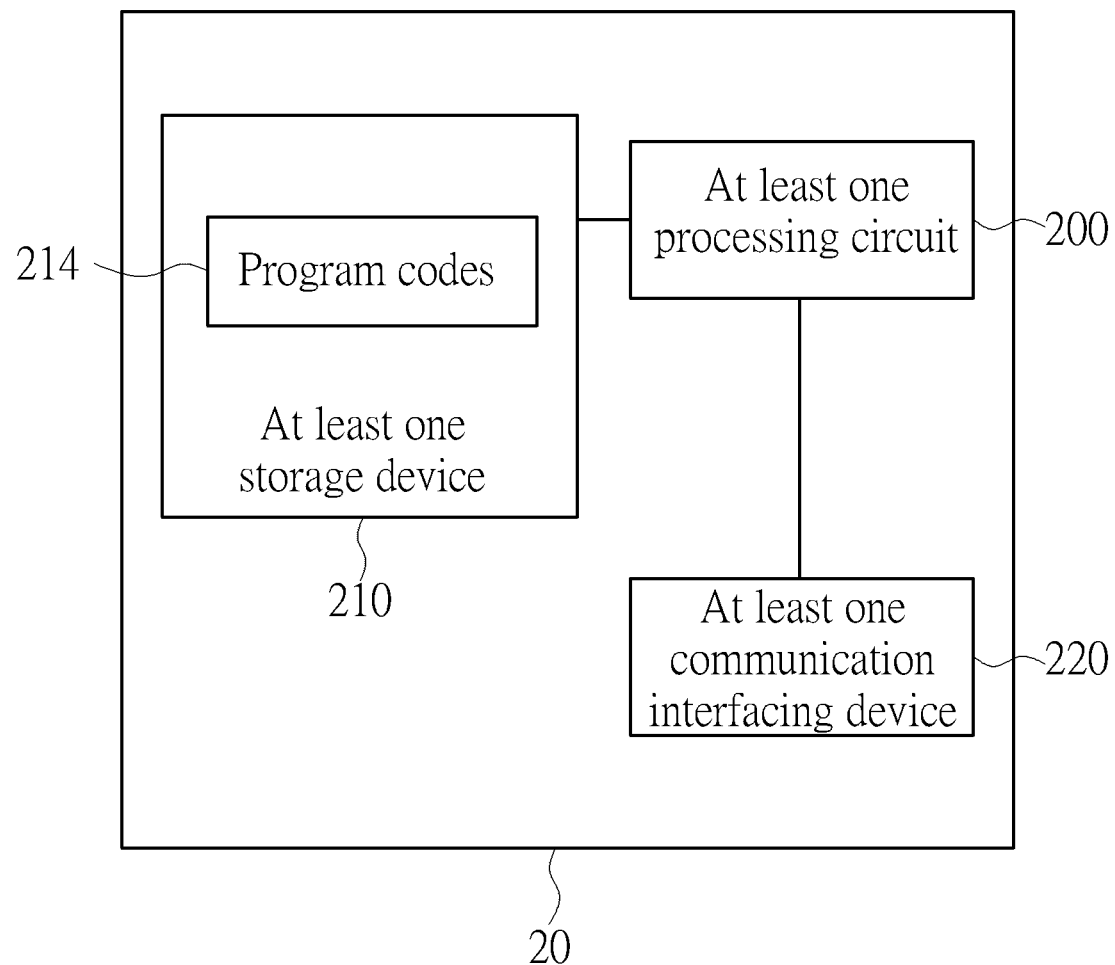
FIG. 2 is a schematic diagram of a communication device according to an example of the present invention.

FIG. 2 is a schematic diagram of a communication device 20 according to an example of the present invention. The communication device 20 may be used for realizing a communication device or a cell shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
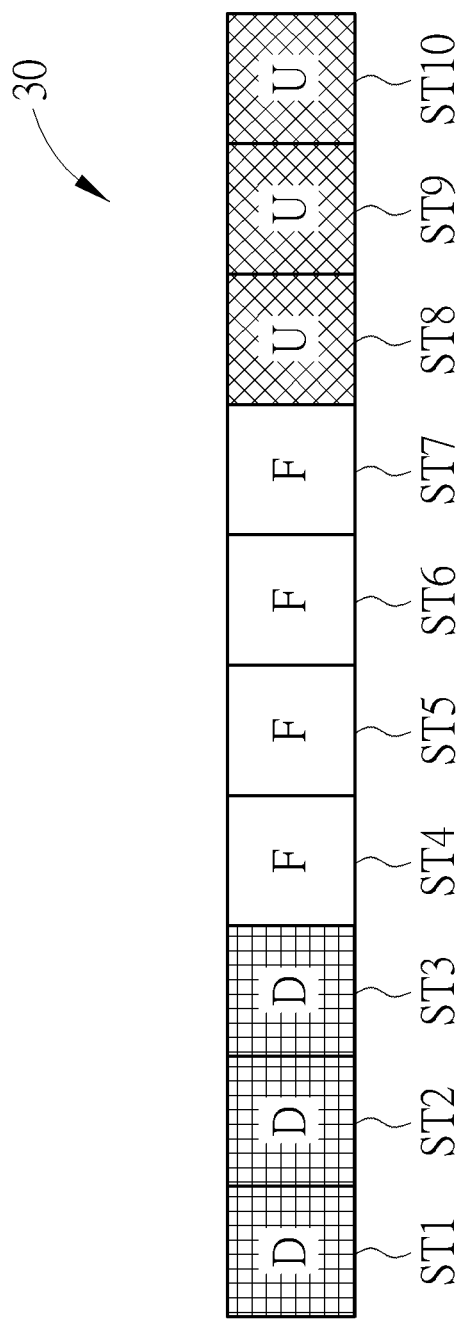
FIG. 3 is a schematic diagram of a TB segmentation according to an example of the present invention.

FIG. 3 is a schematic diagram of a UL/DL configuration 30 according to an example of the present invention. The UL/DL configuration 30 includes 10 slots ST1-ST10, wherein each of the slots ST1-ST10 may be a DL slot (denoted as D), a UL slot (denoted as U) or a flexible slot (denoted as F). A flexible slot may be a DL slot, a UL slot or a self-contained slot (e.g., including DL resource, UL resource and/or flexible resource). A slot may include K symbols, e.g., 14 orthogonal frequency division multiplexing (OFDM) symbols.

A flexible slot of a cell is defined by the 3rd Generation Partnership Project (3GPP) to improve scheduling flexibility. However, a flexible slot structure of the flexible slot may not be known by neighboring cell(s) of the cell. Cross-link interference (CLI) is generated between the cells, and performance of the communication device degrades. In addition, reserving resource in the flexible slot for transmitting control information is not known by the neighboring cell(s). The communication device cannot operate properly, if the control information is not received correctly. Thus, processing (e.g., receiving, identifying and/or protecting) of the flexible slot is an important problem to be solved.

In one example, the determination of the flexible slot structure (e.g., DL slot, UL slot, or self-contained slot) is dynamically decided according to information of a cell, such as a traffic load, a buffer status, etc. In addition, the flexible slot structure may be determined before a start of a period of a UL/DL configuration. The flexible slot structure may not be timely exchanged among cells (e.g., the cells CL1 and CL2).

Figure 4:
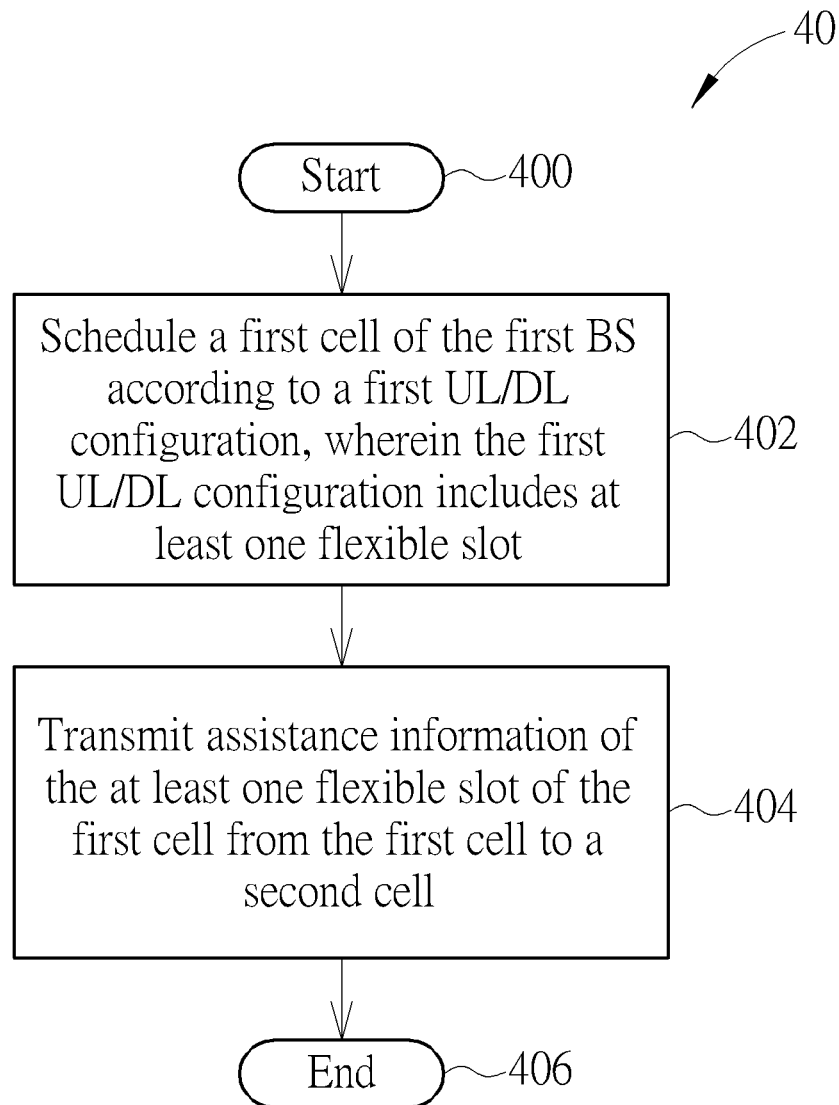
FIG. 4 is a flowchart of a process according to an example of the present invention.

FIG. 4 is a flowchart of a process 40 according to an example of the present invention. The process 40 may be utilized in a first BS, to handle a flexible duplexing. The process 40 may be compiled into the program codes 214 and includes the following steps:

Step 400: Start.

Step 402: Schedule a first cell of the first BS according to a first UL/DL configuration, wherein the first UL/DL configuration includes at least one flexible slot.

Step 404: Transmit assistance information of the at least one flexible slot of the first cell from the first cell to a second cell.

Step 406: End.

According to the process 40, the first BS Schedule a first cell (e.g., cell CL1) of the first BS according to a first UL/DL configuration, wherein the UL/DL configuration includes at least one flexible slot. Then, the first BS transmit assistance information of the at least one flexible slot of the first cell from the first cell to a second cell (e.g., CL2). Thus, the second cell may perform a scheduling according to the assistance information, to reduce a cross-link interference (CLI) caused by the communication device CD2 to the communication device CD1.

Realization of the process 40 is not limited to the above description. The following examples may be applied for realizing the process 40.

In one example, the assistance information includes a size of at least one reserving resource. For example, the at least one reserving resource is located in the at least one flexible slot. In one example, the assistance information includes information of the first UL/DL configuration. In one example, the size of the at least one reserving resource (e.g., in time and/or in frequency) inflexible slots may not be known to neighboring cell(s), e.g., the flexible slot structure may not be exchanged exactly or instantaneously. The at least one reserving resource in time may be a number of OFDM symbols (e.g., continuous or non-continuous). The at least one reserving resource in frequency may be a number of physical resource blocks (PRBs) (e.g., continuous or non-continuous), e.g., bandwidth part(s) or a whole bandwidth.

In one example, the assistance information includes a reserving resource indicator (RRI) indicating at least one reserving resource in the at least one flexible slot. In one example, the RRI indicates at least one of at least one resource comprising a control resource set (CORESET) in the at least one reserving resource and a number of symbols reserved for ultra-reliable and low Latency communications (URLLC) in the at least one reserving resource.

In one example, the assistance information is for performing a scheduling in the second cell. In one example, the second cell belongs to a second BS. The first BS and the second BS may be the same BS or different BSs. In one example, the second cell is configured with a second UL/DL configuration.

Figure 5:
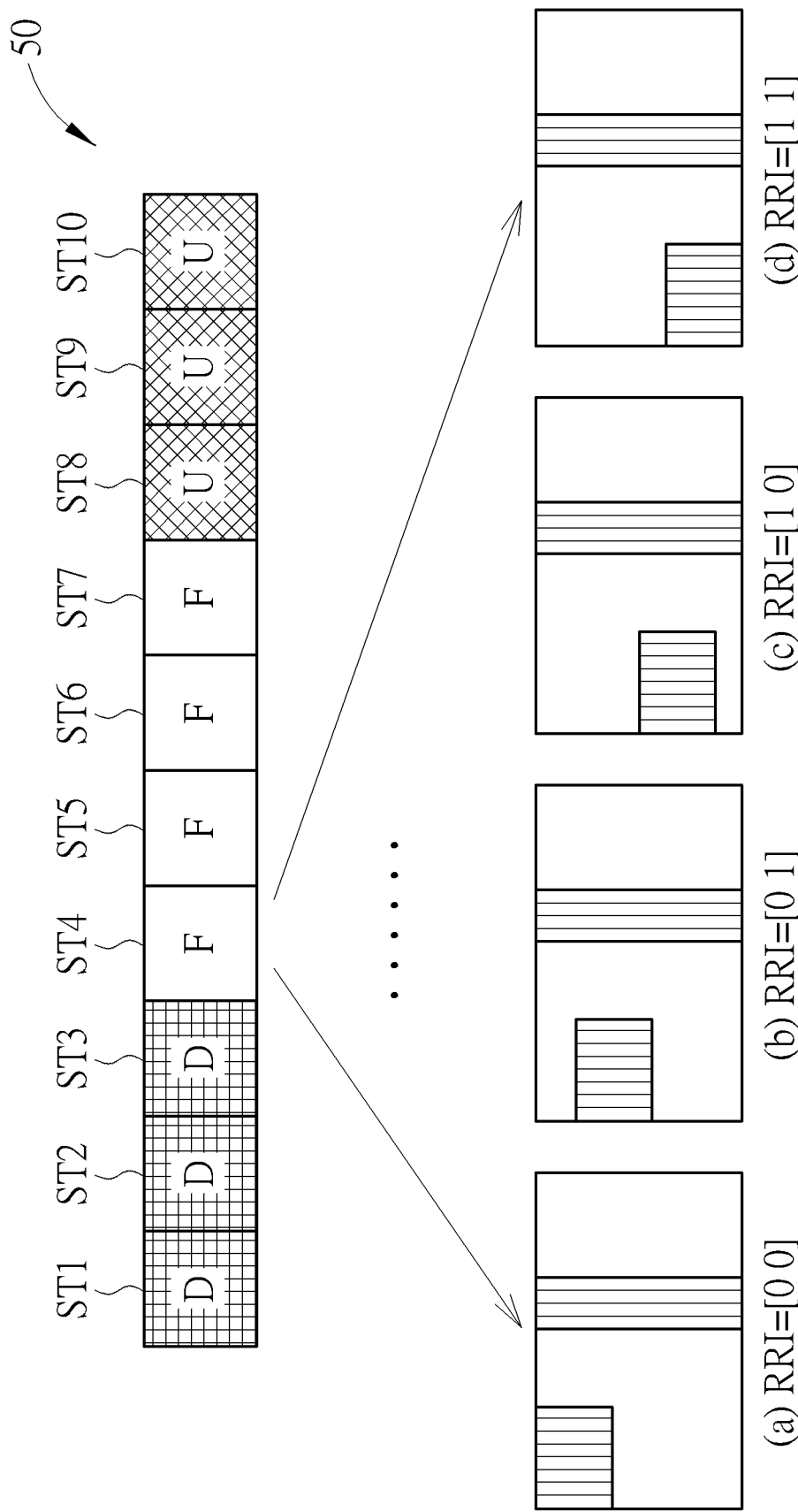
FIG. 5 is a schematic diagram of a UL/DL configuration and a RRI according to an example of the present invention.

FIG. 5 is a schematic diagram of a UL/DL configuration 50 and a RRI according to an example of the present invention. Considering a flexible slot in the UL/DL configuration 50, the RRI indicates at least one resource comprising a CORESET and a number of OFDM symbols reserved for URLLC in the at least one reserving resource. The RRI includes two bits which are used for indicating one of 4 resource allocations (a)-(d) of the CORESET and the number of OFDM symbols for the URLLC. In each of the resource allocations, a vertical axis and a horizontal axis represent a frequency axis and a time axis, respectively.

Figure 6:
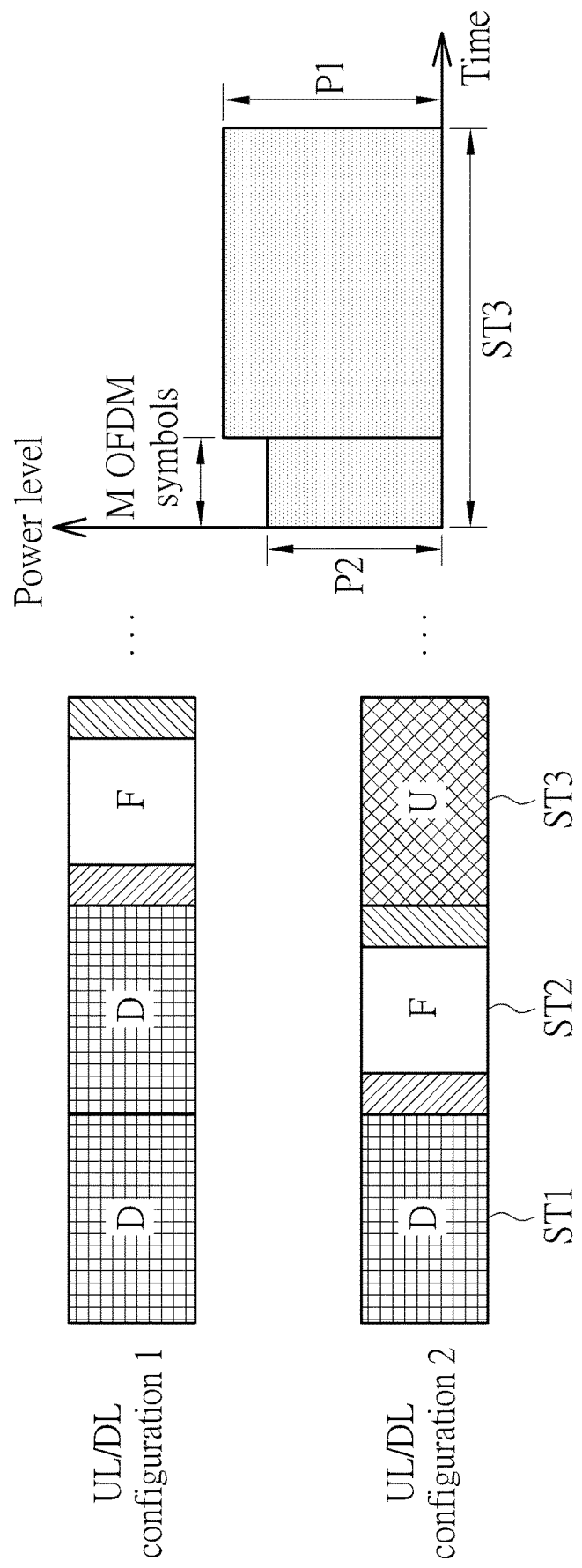
FIG. 6 is a schematic diagram of a power level adjustment according to an example of the present invention.

FIG. 6 is a schematic diagram of a power level adjustment according to an example of the present invention. The cells CL1-CL2 are configured with UL/DL configurations 1-2, respectively, and slots ST1-ST3 of the UL/DL configurations 1-2 are considered in the present example to simplify the illustration. The slots ST1-ST3 of the UL/DL configuration 1 are a DL slot, a DL slot and a flexible slot, respectively. The slots ST1-ST3 of the UL/DL configuration 2 are a DL slot, a flexible slot and a UL slot, respectively. The communication device CD2 may be scheduled by the cell CL2 to perform a UL transmission in the slot ST3. In detail, the communication device CD2 may receive a transmission power control (TPC) command indicating a power level P1 in a UL grant. The communication device CD2 may obtain (e.g., determine, select) a number of OFDM symbols M (e.g., reserving resource) according to at least one of a higher layer signal or a UL grant DL control information (DCI). The communication device CD2 may obtain (e.g., determine, select, calculate) a power level P2 (e.g., P2=wP1) for the M OFDM symbols according to at least one of a higher layer signal or a UL grant DL DCI. Thus, a CLI caused by the communication device CD2 to the communication device CD1 in the slot ST3 (which is the flexible slot for the communication device CD1) is reduced. In one example, P2=0 may be used to reduce more CLI.

Figure 7:
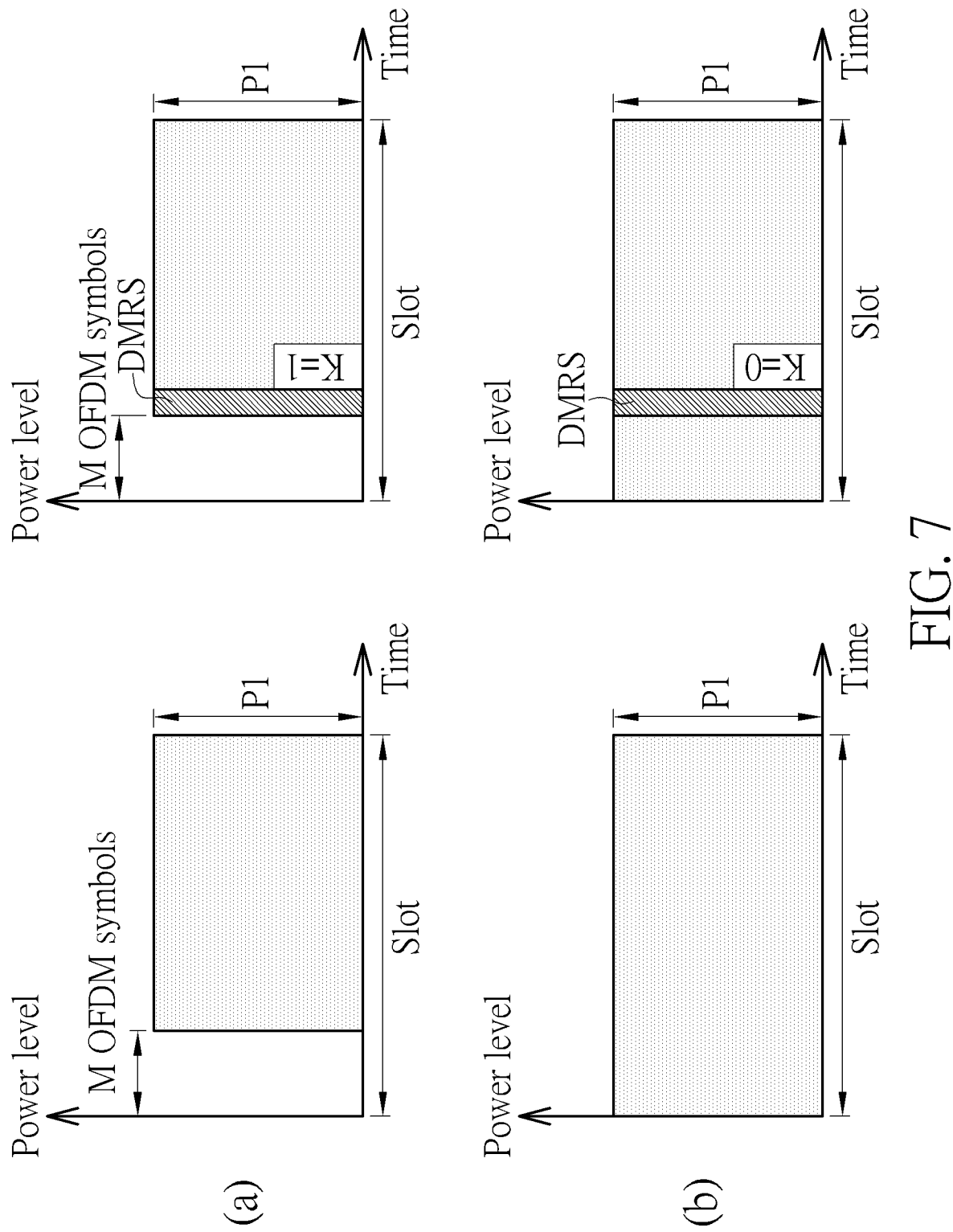
FIG. 7 is a schematic diagram of a detection of a power level adjustment according to an example of the present invention.

FIG. 7 is a schematic diagram of a detection of a power level adjustment according to an example of the present invention. The communication device CD2 may be scheduled (e.g., indicated) to perform a UL transmission with a power level P1 started at a first symbol of a slot according to a UL grant. Then, two cases (a) and (b) of the following operations are illustrated as follows.

For the case (a), the communication device CD2 may determine (e.g., detect, know) that the slot is not a UL slot (e.g., is a flexible slot) according to a flexible slot structure indicator (FSSI) or control information. In the present example, the slot may be a flexible slot for the communication device CD1. Accordingly, the communication device CD2 may start the UL transmission at the M-th symbol, wherein M may be preconfigured, e.g., by a radio resource control (RRC) signal. The communication device CD2 may transmit a signal indicating K=1 after transmitting a demodulation reference signal (DMRS) to the cell CL2, to indicate that M symbols before the DMRS are not transmitted (e.g., dropped). The signal indicating K=1 is not included in the first M symbols. In one example, a position for transmitting the DMRS is a fixed symbol index.

For the case (b), the communication device CD2 may determine (e.g., detect, know) that the slot is a UL slot according to a FSSI or control information. In the present example, the slot may be a flexible slot for the communication device CD1. Accordingly, the communication device CD2 may start the UL transmission at the first symbol. The communication device CD2 may transmit a signal indicating K=0 after transmitting a DMRS to the cell CL2, to indicate that M symbols before the DMRS are transmitted. In the first M symbols, data transmitted before and after the DMRS may be the same, i.e., the data is duplicated. In one example, a position for transmitting the DMRS is a fixed symbol index.

Thus, the cell CL2 can determine whether the first M symbols are transmitted according to the signal indicating K=0 or K=1.

Figure 8:
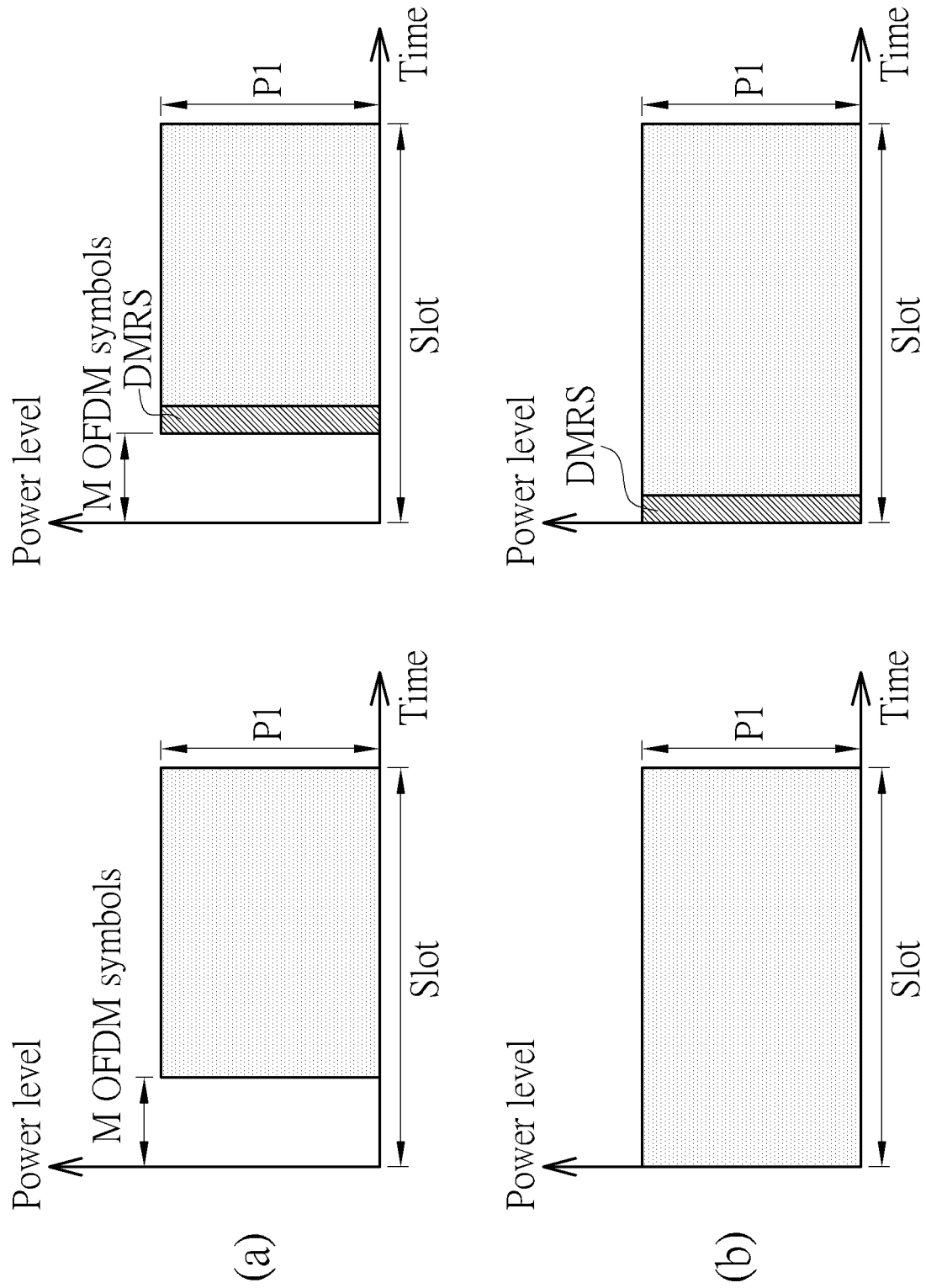
FIG. 8 is a schematic diagram of a detection of a power level adjustment according to an example of the present invention.

FIG. 8 is a schematic diagram of a detection of a power level adjustment according to an example of the present invention. The communication device CD2 may be scheduled (e.g., indicated) to perform a UL transmission with a power level P1 started at a first symbol of a slot according to a UL grant. Then, two cases (a) and (b) are illustrated as follows.

For the case (a), the communication device CD2 may determine (e.g., detect, know) that the slot is not a UL slot (e.g., is a flexible slot) according to a FSSI or control information. Accordingly, the communication device CD2 may start the UL transmission at the M-th symbol, wherein M may be preconfigured, e.g., by a RRC signal. The communication device CD2 may transmit a DMRS to the cell CL2, to indicate that symbols after the DMRS are transmitted, i.e., M symbols before the DMRS are not transmitted (e.g., dropped).

For the case (b), the communication device CD2 may determine (e.g., detect, know) that the slot is a UL slot according to a FSSI or control information. Accordingly, the communication device CD2 may start the UL transmission at the first symbol. The communication device CD2 may transmit a DMRS to the cell CL2, to indicate that all symbols after the DMRS are transmitted.

Thus, the cell CL2 can determine which symbols are transmitted according to the reception of the DMRS.

Figure 9:
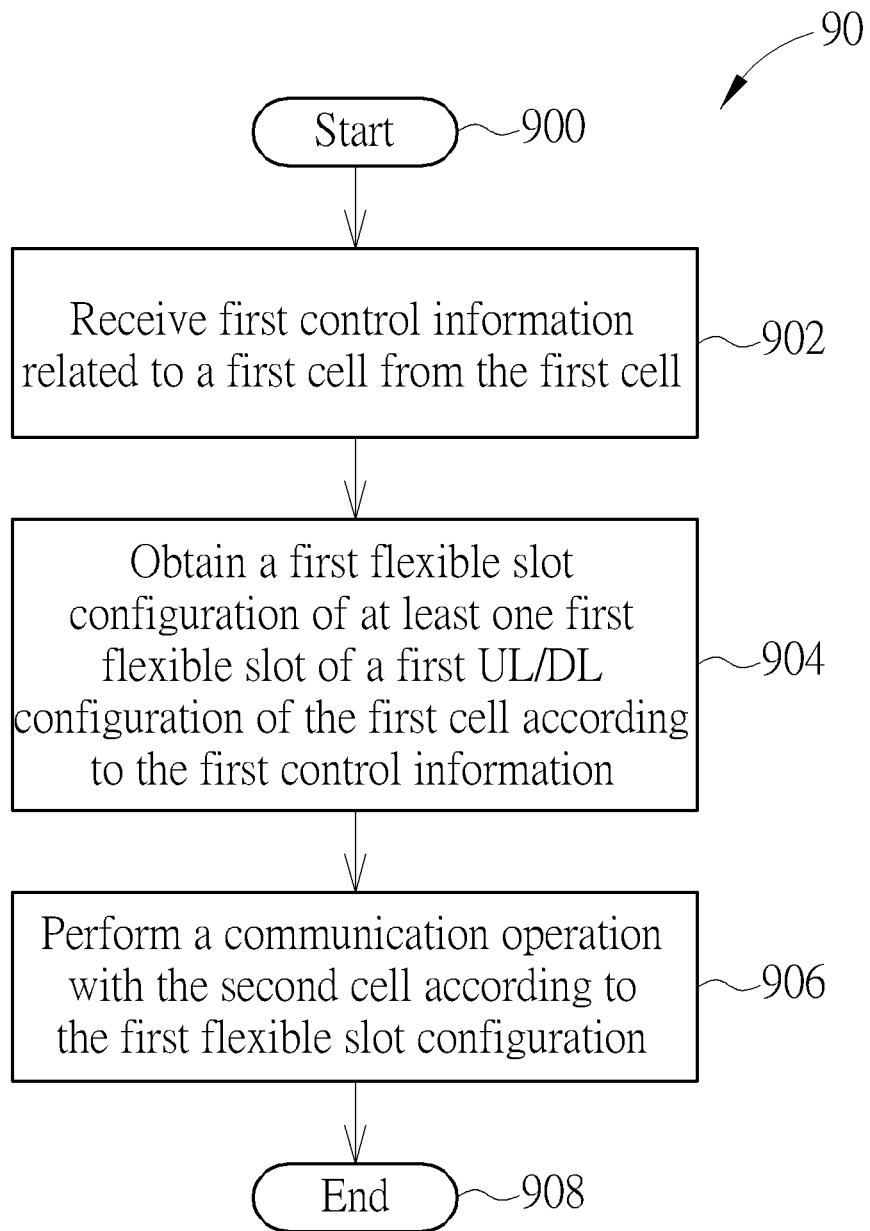
FIG. 9 is a flowchart of a process according to an example of the present invention.

FIG. 9 is a flowchart of a process 90 according to an example of the present invention. The process 90 may be utilized in the communication device CD2, to handle a flexible duplexing. The process 90 may be compiled into the program codes 214 and includes the following steps:

Step 900: Start.

Step 902: Receive first control information related to a first cell from the first cell.

Step 904: Obtain a first flexible slot configuration of at least one first flexible slot of a first UL/DL configuration of the first cell according to the first control information.

Step 906: Perform a communication operation with a second cell according to the first flexible slot configuration.

Step 908: End.

According to the process 90, the communication device CD2 receives (e.g., listens) first control information related to a first cell (e.g., cell CL1) from the first cell. The communication device CD2 obtains a first flexible slot configuration of at least one first flexible slot of a first UL/DL configuration of the first cell according to the first control information. Then, the communication device CD2 performs a communication operation with a second cell (e.g., cell CL2) according to the first flexible slot configuration. Thus, a CLI caused by the communication device CD2 to the communication device CD1 is reduced. In one example, the first cell and the second cell belong to (e.g., be controlled by) a same BS or different BSs.

Realization of the process 90 is not limited to the above description. The following examples may be applied for realizing the process 90.

In one example, the communication operation includes at least one of a reception of a DCI and a measurement in a flexible slot of the second cell. In one example, the communication device CD2 further receives second control information related to the second cell from the second cell. The communication device CD2 obtains a second flexible slot configuration of at least one second flexible slot of a second UL/DL configuration of the second cell according to the second control information. Then, the communication device CD2 performs the communication operation with the second cell according to the first flexible slot configuration and the second flexible slot configuration. It should be noted that the communication device CD2 mainly performs the communication operation based on the second flexible slot configuration while taking the first flexible slot configuration as reference for slightly modifying the communication operation.

In one example, the first flexible slot configuration is indicated by a FSSI in the first control information. That is, the FSSI may indicate which slot is a self-contained slot. Further, the RRI may be received in a physical layer signaling, a medium access control (MAC) control element (CE) or a RRC signaling. In one example, the first UL/DL configuration includes (e.g., only) the at least one first flexible slot. In one example, at least one transition point of the at least one first flexible slot is UE-specific.

In one example, the communication device CD2 further receives a RRI indicating at least one reserving resource in the at least one first flexible slot. Further, the RRI may be received in a physical layer signaling or a RRC signaling.

In one example, the communication operation includes performing a first transmission with a first power level in a first part of one of the at least one first flexible slot with the second cell; and performing a second transmission with a second power level in a second part of the one of the at least one first flexible slot with the second cell, wherein the first power level is smaller than the second power level. In one example, a width of the first part is obtained according to a RRI indicating at least one reserving resource in the at least one first flexible slot and/or a FSSI indicating the first flexible slot configuration. In one example, a width of the first part is obtained according to a higher layer signaling and/or a UL grant DCI. In one example, a unit of the width is represented (e.g., counted) by the number of OFDM symbols.

In one example, the communication operation includes at least one of a reception of a DCI and a measurement in a DL part of one of the at least one flexible slot.

Figure 10:
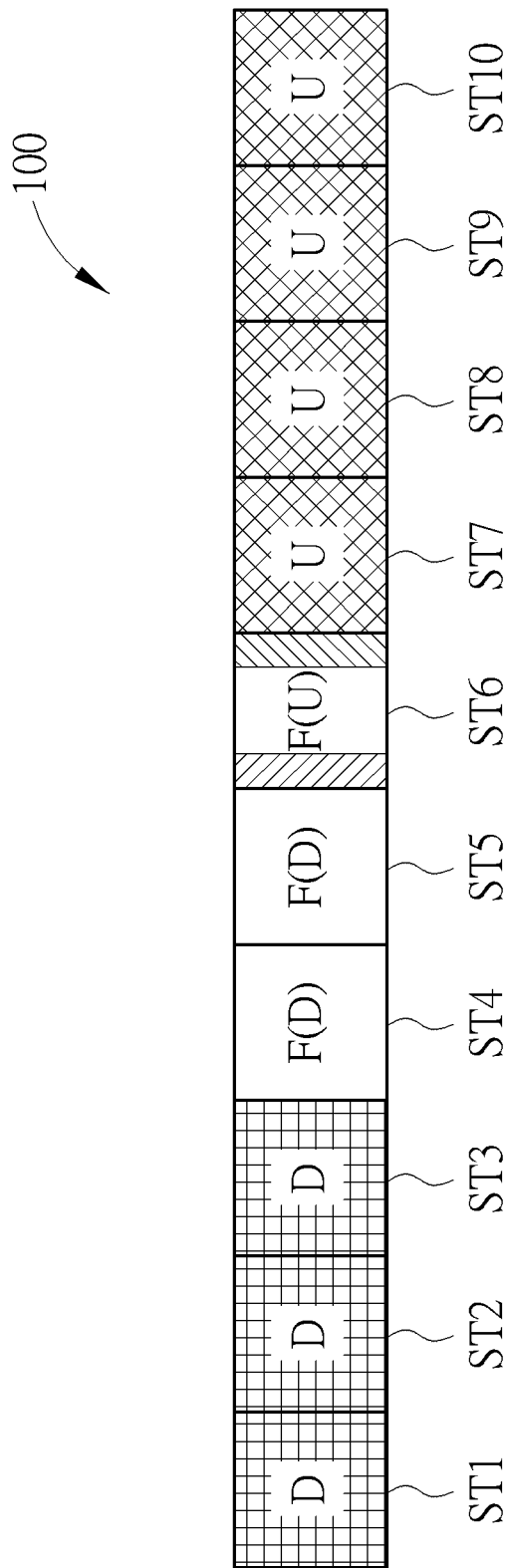
FIG. 10 is a schematic diagram of a UL/DL configuration according to an example of the present invention.

FIG. 10 is a schematic diagram of a UL/DL configuration 100 according to an example of the present invention. The UL/DL configuration 80 includes 10 slots ST1-ST10, wherein each of the slots ST1-ST10 is a DL slot (denoted as D), a UL slot (denoted as U) or a flexible slot (denoted as F). A flexible slot may be a DL slot, a UL slot or a self-contained slot (e.g., including DL resource, UL resource and/or flexible resource). In the present example, the slots ST4-ST7 are the flexible slots, wherein the slots ST4-ST5 the DL slots and the slot ST7 is the UL slot. In one example, the UE receives a FSSI (e.g., bits [1 0]) indicating that the 3rd slot of the flexible slots is a self-contained slot. In addition, the UE may obtain (e.g., determine) that the slots (i.e., the slots ST1-ST5) before the self-contained slot are the DL slots and the slots (i.e., the slots ST7-ST10) after the self-contained slot are the UL slots. In one example, the UE receives a FSSI (e.g., bits [1 1 1 0]) indicating that the last slot of the flexible slots is the UL slot. In one example, the UE simply treats (e.g., determines) all the flexible slots as the self-contained slots.

Examples of a self-contained slot are not limited to the above description. In one example, a resource not indicated as "fixed UL", "fixed DL" or "reserved/blank" can be determined as "flexible resource", and a transmission direction of the flexible resource can be changed dynamically. In one example, a transmission direction for the NR can be defined by a set of resources (e.g., slot) including at least one of a fixed DL resource, a fixed UL resource and a flexible resource, and a transmission direction of the flexible resource can be changed dynamically according to a physical layer signaling and/or a MAC layer signaling. In one example, a self-contained slot can be treated as a special slot including at least one of a DL resource (e.g., DL pilot time slot, DwPTS), a guard period (GP) and a UL resource (e.g., UL pilot time slot, UpPTS).

Figure 11:
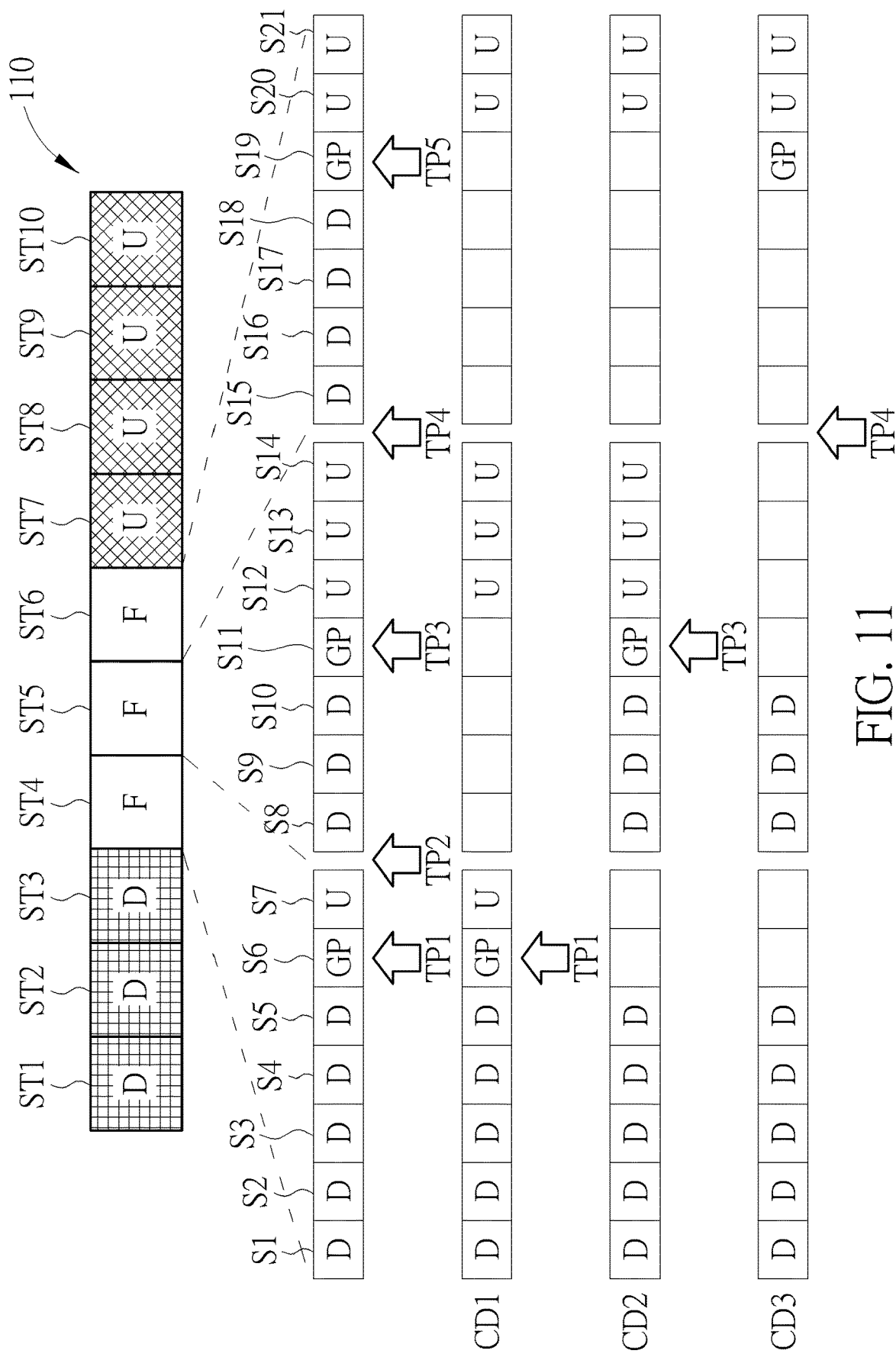
FIG. 11 is a schematic diagram of a UL/DL configuration with UE-specific communication operations according to an example of the present invention.

FIG. 11 is a schematic diagram of a UL/DL configuration 110 with UE-specific communication operations according to an example of the present invention. The UL/DL configuration 90 includes 10 slots ST1-ST10, wherein each of the slots ST1-ST10 is a DL slot (denoted as D), a UL slot (denoted as U) or a flexible slot (denoted as F). A flexible slot may be a DL slot, a UL slot or a self-contained slot (e.g., including DL resource, UL resource and/or flexible resource). A slot may include 7 symbols, e.g., OFDM symbols. In the present example, all the slots ST1-ST10 are the flexible slots, wherein the slots ST1-ST3 are the DL slots, the slots ST4-ST6 are the self-contained slots and the slots ST7-ST10 are the UL slots.

Considering the slots ST4-ST6, there are 21 symbols S1-S21. A symbol may be a DL symbol (denoted as D), a UL symbol (denoted as U) or a guard period (denoted as GP). There are 5 transition points TP1-TP5 represented by arrows. A transition point may be indicated or activated by a higher layer signaling, a RRC signaling, a MAC CE or a physical layer signaling. A communication device may obtain scheduling information about a position of a transition point of the UL/DL configuration 110, a position of monitoring DL signaling, and/or a UL grant, which is included in a DCI of a fixed DL slot before flexible slot(s).

As stated in the previous description, a transition point may be UE-specific. The communication devices CD1-CD3 are configured with the transition points TP1, TP3 and TP4, respectively. For a communication device, transmission directions of the symbols before and after are DL and UL, respectively, and the communication device only performs communication operations in the labeled symbols. For example, the communication device CD1 performs in the symbols S1-S5, S7, S12-S14 and S20-S21.

Figure 12:
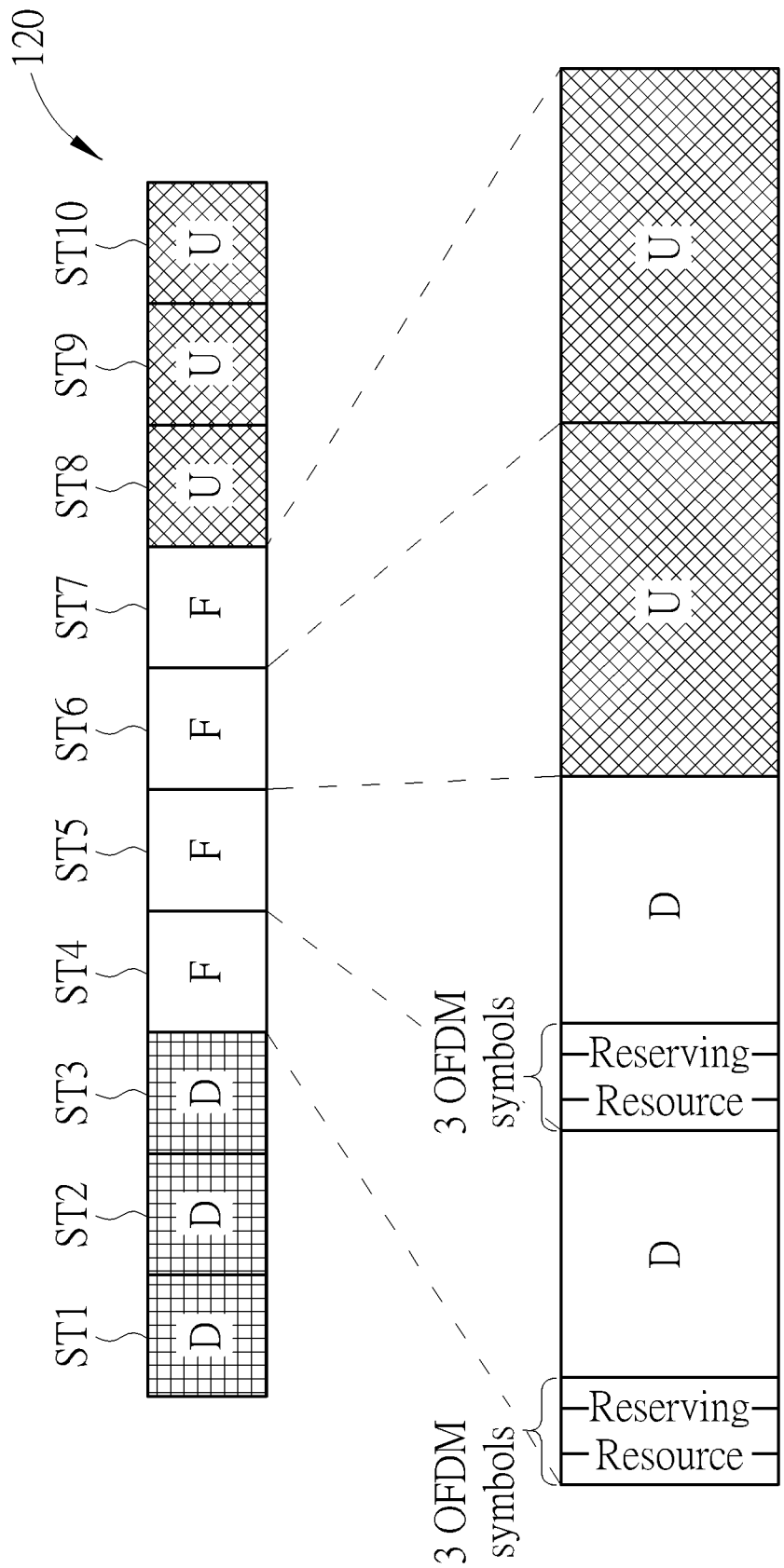
FIG. 12 is a schematic diagram of a UL/DL configuration, a RRI and a FSSI according to an example of the present invention.

FIG. 12 is a schematic diagram of a UL/DL configuration 120, a RRI and a FSSI according to an example of the present invention. The UL/DL configuration 120 includes 10 slots ST1-ST10, wherein each of the slots ST1-ST10 is a DL slot (denoted as D), a UL slot (denoted as U) or a flexible slot (denoted as F). A flexible slot may be a DL slot, a UL slot or a self-contained slot (e.g., including DL resource, UL resource and/or flexible resource). In the present example, the slots ST4-ST7 are the flexible slots, wherein the slots ST4-ST5 are the DL slots and the slots ST6-ST7 are the UL slots. The communication device CD2 may receive a FSSI (e.g., bits [1 1 0 0]) and a RRI (e.g., bits [1 1]) in the slots ST1-ST3, e.g., in physical layer signalings. In detail, the bits [1 1 0 0] of the FSSI correspond to the slots ST4-ST7, respectively, and indicate that the slots ST4-ST5 include DL parts (e.g., the DL slots or the self-contained slots) and the slots ST6-ST7 are the UL slots. The bits [1 1] of the RRI indicate the number "3", and indicates that 3 OFDM symbols are reserved as reserving resources in each of the slots ST4-ST5. Thus, the communication device CD2 can operate properly according to the information of the slots ST4-ST7.

It should be noted that the FSSI and/or the RRI may be transmitted in a slot including a DL part, wherein the slot may be a fixed DL slot and/or a self-contained slot. In one example, the FSSI and/or the RRI may be transmitted multiple times in DL slots, slots including DL parts, to improve the robustness of the FSSI and/or the RRI.

Figure 13:
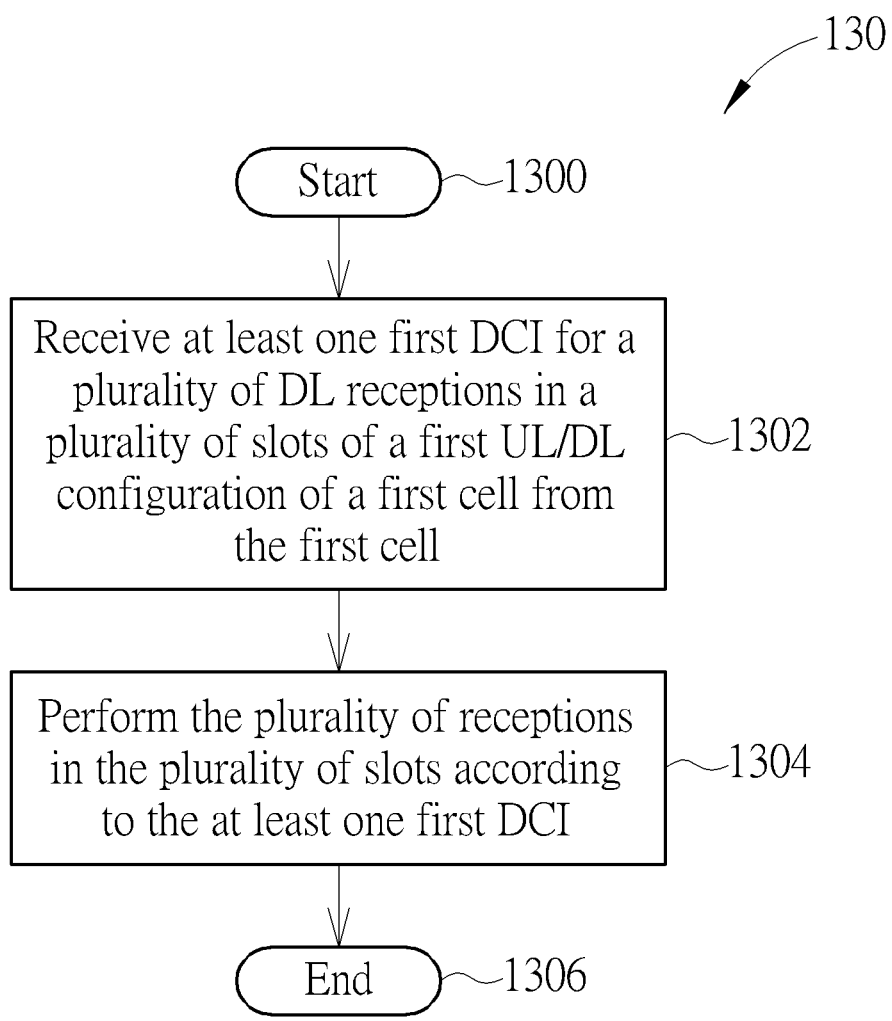
FIG. 13 is a flowchart of a process according to an example of the present invention.

FIG. 13 is a flowchart of a process 130 according to an example of the present invention. The process 130 may be utilized in the communication device CD1, to handle a data scheduling. The process 130 may be compiled into the program codes 214 and includes the following steps:

Step 1300: Start.

Step 1302: Receive at least one first DCI detection for a plurality of DL receptions in a plurality of slots of a first UL/DL configuration of a first cell from the first cell.

Step 1304: Perform the plurality of receptions in the plurality of slots according to the at least one first DCI.

Step 1306: End.

According to the process 130, the communication device CD1 receives at least one first DCI detection for a plurality of DL receptions in a plurality of slots of a first UL/DL configuration of a first cell from the first cell. Then, the communication device CD1 performs the plurality of receptions in the plurality of slots according to the at least one first DCI. In one example, the first UL/DL configuration is configured by a higher layer signalling (e.g., RRC signalling).

Realization of the process 130 is not limited to the above description. The following examples may be applied for realizing the process 130.

In one example, the at least one first DCI includes a position information of each of the plurality of DL receptions. Further, the position information includes a starting position and an ending position of the each of the plurality of DL receptions. In one example, a physical resource block (PRB) allocation of each of the plurality of DL receptions is the same. In one example, a same transport block (TB) is repeated in each of the plurality of DL receptions. In one example, the plurality of slots include at least one flexible resource. In one example, the plurality of DL receptions are in the plurality of slots of one of at least one bandwidth part, respectively. In one example, the plurality of DL receptions forma contiguous DL reception. That is, the contiguous DL reception is performed across the plurality of slots.

In one example, the number of the at least one bandwidth part is determined according to a system bandwidth, a higher layer signalling and/or a fixed value. In one example, the number of PRBs in a bandwidth part is determined according to a system bandwidth, a higher layer signalling and/or a fixed value.

In one example, the communication device CD1 receiving a second DCI indicating at least one resource type of at least one flexible resource in the plurality of slots. Then, the communication device CD1 performs the plurality of DL receptions in the at least one flexible resource in the plurality of slots according to the at least one first DCI and the second DCI. Further, the at least one type includes at least one direction (e.g., UL, DL and/or flexible) of the at least one flexible resource. In one example, the at least one first DCI is received in a DL slot of the first UL/DL configuration. Further, a direction of the DL slot is DL for a second UL/DL configuration of a second cell. In one example, the first cell and the second cell belong to (e.g., be controlled by) a same BS or different BSs.

It should be noted that the second DCI may specify the resource type(s) of the flexible resource(s) and cannot specify (or change) resource type(s) of UL slot(s) (UL resource(s)) and DL slot(s) (DL resource(s)) specified by the first UL/DL configuration.

Figure 14:
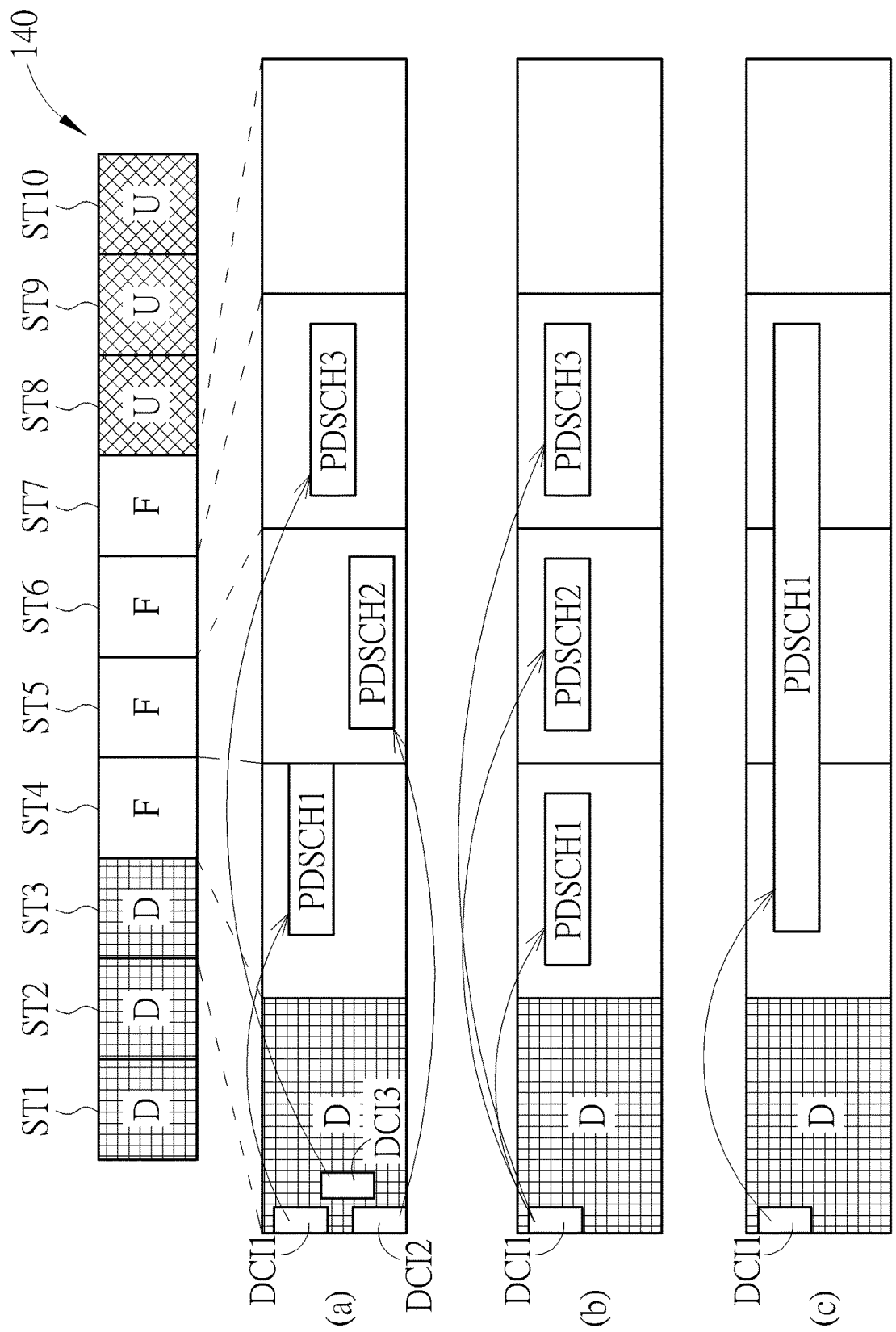
FIG. 14 is a schematic diagram of a UL/DL configuration with corresponding operations according to an example of the present invention.

FIG. 14 is a schematic diagram of a UL/DL configuration 140 with corresponding operations according to an example of the present invention. The UL/DL configuration 140 includes 10 slots ST1-ST10, wherein each of the slots ST1-ST10 is a DL slot (denoted as D), a UL slot (denoted as U) or a flexible slot (denoted as F). A flexible slot may be (e.g., configured by the second DCI as) a DL slot, a UL slot or a self-contained slot (e.g., including DL resource, UL resource and/or flexible resource). In the present example, the slots ST4-ST7 are the flexible slots. Three cases (a)-(c) of utilizations of a bandwidth part are discussed as follows.

In the case (a), the communication device CD2 performs a DCI detection to receive DCIs DCI1-DCI3 in the slot ST3. The DCIs DCI1-DCI3 indicate receptions of physical DL shared channels (PDSCHs) PDSCH1-PDSCH3 in the slots ST4-ST6, respectively. The PDSCHs PDSCH1-PDSCH3 are transmitted in PRBs of a bandwidth part, and the PRBs are partly different or completely different. Thus, the communication device CD2 can receive the PDSCHs PDSCH1-PDSCH3 in the slots ST4-ST6 according to the DCIs DCI1-DCI3.

In the case (b), the communication device CD2 performs a DCI detection to receive a DCI DCI1 in the slot ST3. The DCI DCI1 indicates receptions of PDSCHs PDSCH1-PDSCH3 in the slots ST4-ST6, respectively. The PDSCHs PDSCH1-PDSCH3 are transmitted in the same PRBs of a bandwidth part. Thus, the communication device CD2 can receive the PDSCHs PDSCH1-PDSCH3 in the slots ST4-ST6 according to the DCI DCI1.

In the case (c), the communication device CD2 performs a DCI detection to receive a DCI DCI1 in the slot ST3. The DCI DCI1 indicates a contiguous reception of a PDSCH PDSCH1 in the slots ST4-ST6. That is, the PDSCH PDSCH1 is received in the same PRBs of a bandwidth part across the slots ST4-ST6. Thus, the communication device CD2 can receive the PDSCH PDSCH1 in the slots ST4-ST6 according to the DCI DCI1.

Figure 15:
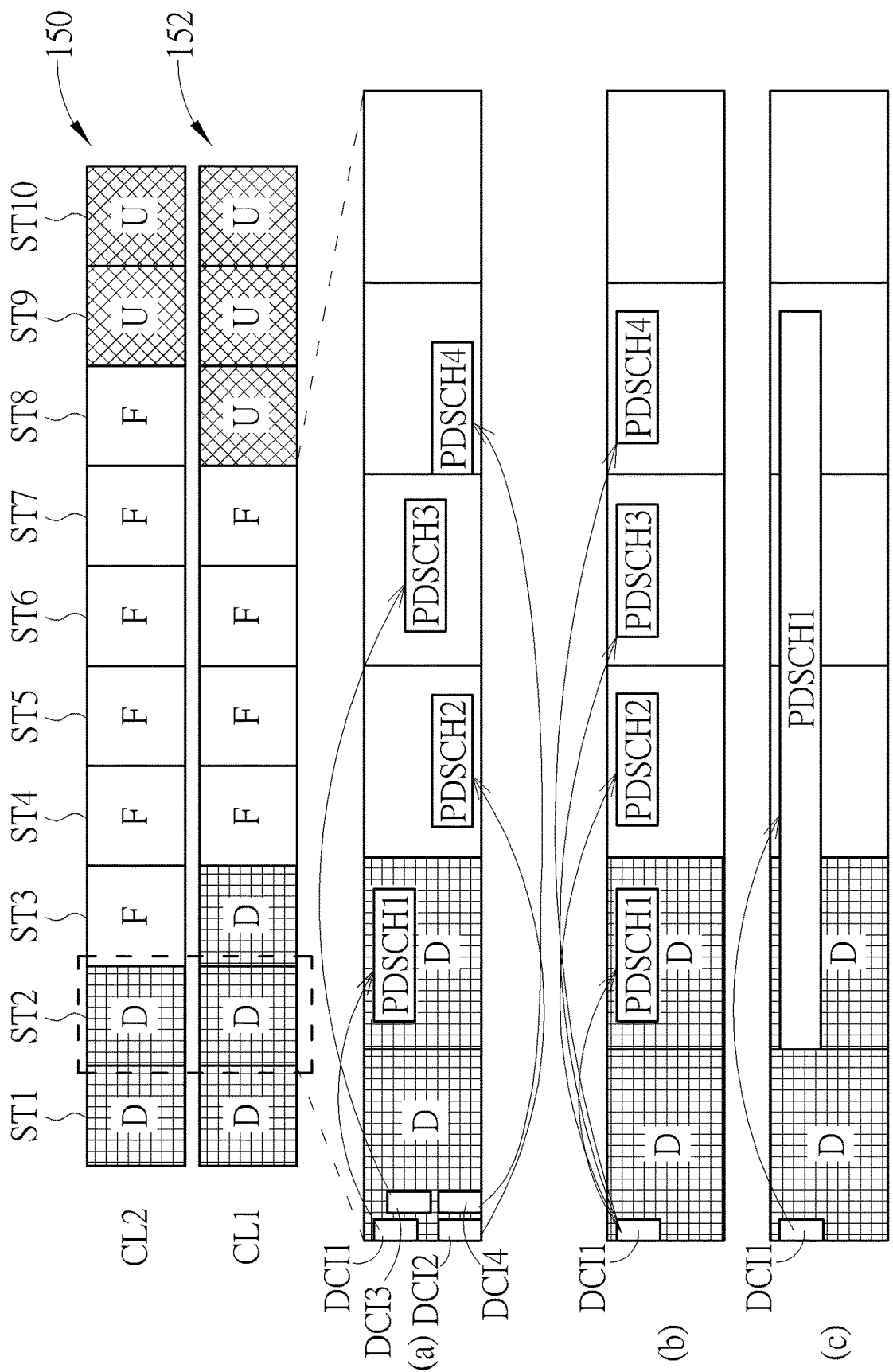
FIG. 15 is a schematic diagram of a UL/DL configuration with corresponding operations according to an example of the present invention.

FIG. 15 is a schematic diagram of UL/DL configurations 150 and 152 with corresponding operations according to an example of the present invention. Each of the UL/DL configurations 150 and 152 includes 10 slots ST1-ST10, wherein each of the slots ST1-ST10 is a DL slot (denoted as D), a UL slot (denoted as U) or a flexible slot (denoted as F). A flexible slot may be a DL slot, a UL slot or a self-contained slot (e.g., including DL resource, UL resource and/or flexible resource). The UL/DL configurations 150 and 152 are operated by the cells CL2 and CL1, respectively. In the present example, the slots ST4-ST7 of the UL/DL configurations 150 and 152 are the flexible slots. Three cases (a)-(c) of utilizations of a bandwidth part are discussed as follows.

In the case (a), the communication device CD2 performs a DCI detection to receive DCIs DCI1-DCI4 in the slot ST2. The DCIs DCI1-DCI4 indicate receptions of PDSCHs PDSCH1-PDSCH4 in the slots ST3-ST6, respectively. The PDSCHs PDSCH1-PDSCH4 are transmitted in PRBs of a bandwidth part, and the PRBs are partly different or completely different. Note that the PDSCH PDSCH1 locates in the DL slot while the PDSCHs PDSCH2-PDSCH4 locate in the flexible slots. Thus, the communication device CD2 can receive the PDSCHs PDSCH1-PDSCH4 in the slots ST3-ST6 according to the DCIs DCI1-DCI4.

In the case (b), the communication device CD2 performs a DCI detection to receive a DCI DCI1 in the slot ST2. The DCI DCI1 indicates receptions of PDSCHs PDSCH1-PDSCH4 in the slots ST3-ST6, respectively. The PDSCHs PDSCH1-PDSCH4 are transmitted in the same PRBs of a bandwidth part. Note that the PDSCH PDSCH1 locates in the DL slot while the PDSCHs PDSCH2-PDSCH4 locate in the flexible slots. Thus, the communication device CD2 can receive the PDSCHs PDSCH1-PDSCH4 in the slots ST3-ST6 according to the DCI DCI1.

In the case (c), the communication device CD2 performs a DCI detection to receive a DCI DCI1 in the slot ST2. The DCI DCI1 indicates a contiguous reception of a PDSCH PDSCH1 in the slots ST3-ST6. That is, the PDSCH PDSCH1 is received in the same PRBs of a bandwidth part across the slots ST3-ST6. Note that part of the PDSCH PDSCH1 locates in the DL slot while the rest of the PDSCH PDSCH1 locates in the flexible slots. Thus, the communication device CD2 can receive the PDSCH PDSCH1 in the slots ST3-ST6 according to the DCI DCI1.

Figure 16:
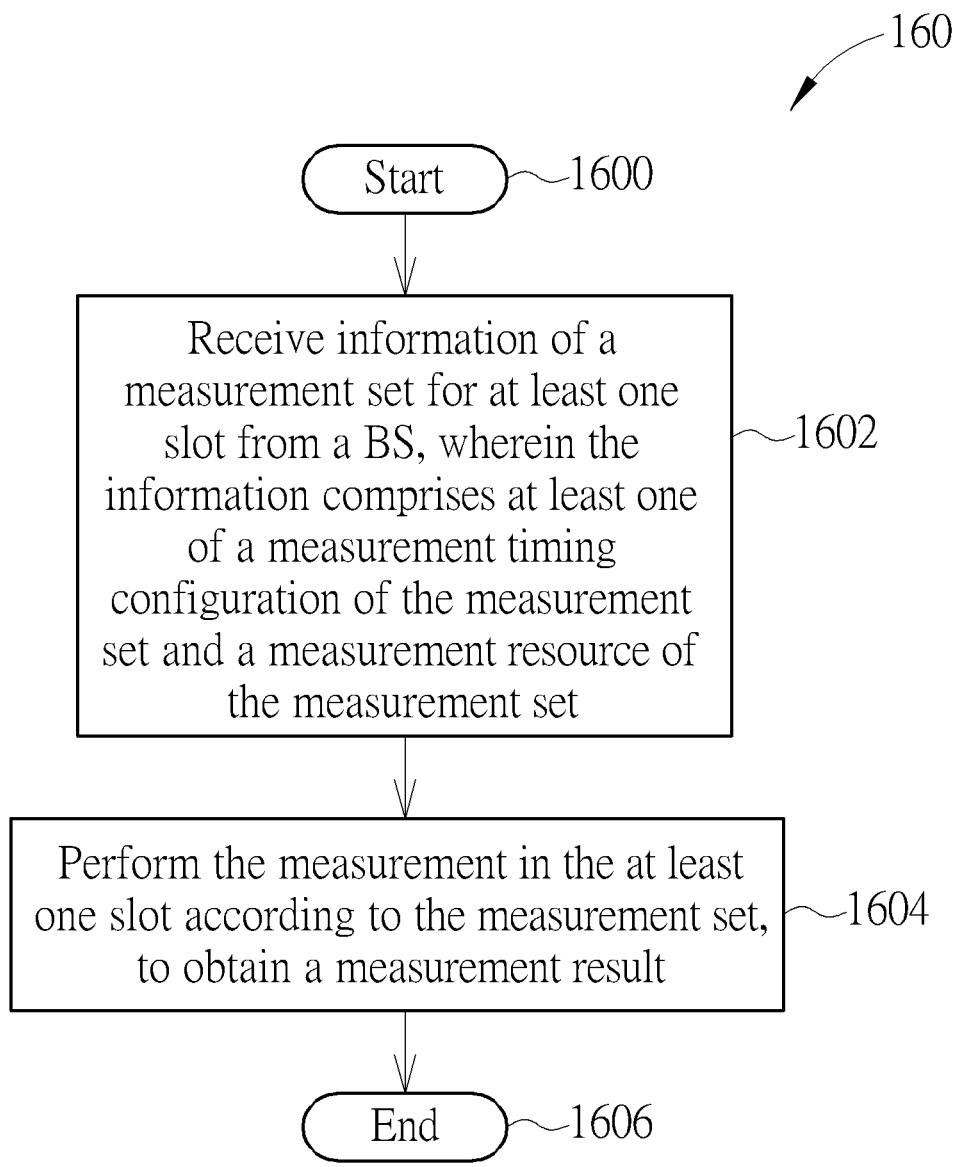
FIG. 16 is a flowchart of a process according to an example of the present invention.

FIG. 16 is a flowchart of a process 160 according to an example of the present invention. The process 160 may be utilized in the communication device CD1, to handle a measurement. The process 160 may be compiled into the program codes 214 and includes the following steps:

Step 1600: Start.

Step 1602: Receive information of a measurement set for at least one slot from a BS, wherein the information comprises at least one of a measurement timing configuration of the measurement set and a measurement resource of the measurement set.

Step 1604: Perform the measurement in the at least one slot according to the measurement set, to obtain a measurement result.

Step 1606: End.

According to the process 160, the communication device CD1 receives information of a measurement set for at least one slot from a BS, wherein the information comprises at least one of a measurement timing configuration of the measurement set and a measurement resource of the measurement set. Then, the communication device CD1 performs the measurement in the at least one slot according to the measurement set, to obtain a measurement result.

Realization of the process 160 is not limited to the above description. The following examples may be applied for realizing the process 160.

In one example, the measurement timing configuration comprises at least one of a layer-1 average duration, a measurement duration, a periodicity, at least one slot and at least one symbol offset. In one example, the measurement resource comprises at least one bandwidth part for the measurement. In one example, the at least one bandwidth part is determined according to at least one of a system bandwidth and a higher layer signalling.

In one example, the measurement resource does not overlap with any reserving resource. In one example, the measurement comprises a received signal strength indicator (RSSI) measurement.

In one example, the measurement result comprises at least one of an average received signal strength indicator (RSSI) and a channel occupancy. The average RSSI may be defined as an average receive (Rx) power within an average duration. The channel occupancy may be defined as a percentage of time duration where the RSSI is greater than a channel occupancy threshold within the average duration. For example, the average duration is T, and the RSSI is greater than the channel occupancy threshold within time durations Ta and Tb in the average duration T. Accordingly, the communication device CD1 can obtain that the channel occupancy is (Ta+Tb)/T.

Figure 17:
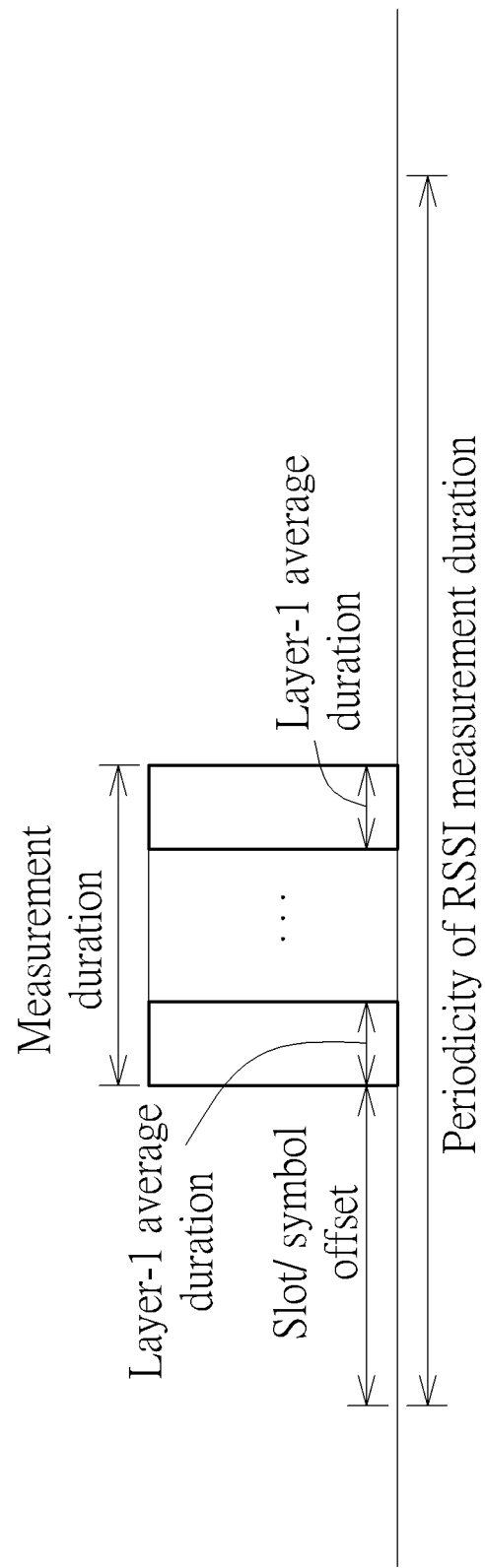
FIG. 17 is a schematic diagram of a measurement timing configuration according to an example of the present invention.

FIG. 17 is a schematic diagram of a measurement timing configuration according to an example of the present invention. The communication device CD1 may be configured with a measurement set including a measurement timing configuration. The measurement timing configuration includes layer-1 average duration(s), a measurement duration, a periodicity of a RSSI measurement duration and a slot/symbol offset. As shown in FIG. 17, the measurement duration may include multiple (e.g., 5) layer-1 average durations. The slot/slot offset is a time distance between a start of the periodicity and a start of the measurement duration. According to the measurement timing configuration, the communication device CD1 performs measurements in the layer-1 average durations, and obtains corresponding measurement results (e.g., average RSSIs and/or channel occupancies).

Figure 18:
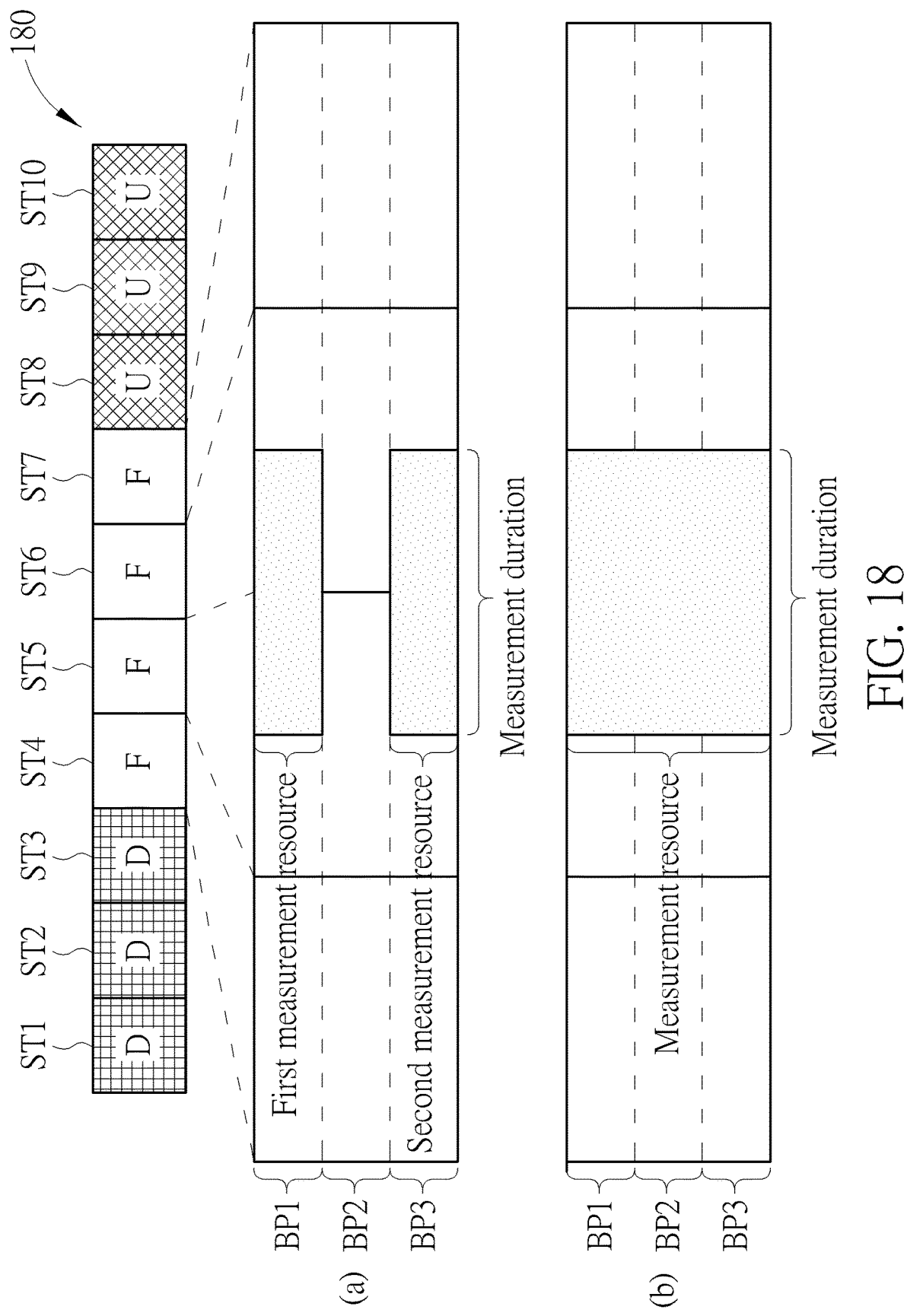
FIG. 18 is a schematic diagram of a UL/DL configuration with corresponding measurements according to an example of the present invention.

FIG. 18 is a schematic diagram of a UL/DL configuration 180 with corresponding measurements according to an example of the present invention. The UL/DL configuration 180 includes 10 slots ST1-ST10 and 3 bandwidth parts BP1-BP3, wherein each of the slots ST1-ST10 is a DL slot (denoted as D), a UL slot (denoted as U) or a flexible slot (denoted as F). A flexible slot may be (e.g., configured by a DCI as) a DL slot, a UL slot or a self-contained slot (e.g., including DL resource, UL resource and/or flexible resource). In the present example, the slots ST4-ST7 are the flexible slots. Two cases (a)-(b) of utilizations of bandwidth parts are discussed as follows.

In the case (a), the communication device CD1 receives information of a measurement set for the slots ST5-ST6, wherein the information includes a measurement duration and a first measurement resource and a second measurement resource in the slots ST5-ST6 for the bandwidth parts BP1 and BP3. Then, the communication device CD1 performs measurements (e.g., RSSI measurements) in the measurement resources of the slots ST5-ST6 of the bandwidth parts BP1 and BP3 according to the measurement set, to obtain measurement results (e.g., RSSIs). The measurements indifferent bandwidth parts may be performed independently.

In the case (b), the communication device CD1 receives information of a measurement set for the slots ST5-ST6, wherein the information includes a measurement duration and a measurement resource in the slots ST5-ST6 for the bandwidth parts BP1-BP3. Then, the communication device CD1 performs measurements (e.g., RSSI measurements) in the corresponding measurement resources of the slots ST5-ST6 of the bandwidth parts BP1-BP3 according to the measurement set, to obtain measurement results (e.g., RSSIs). The measurements in different bandwidth parts may be performed independently.

Figure 19:
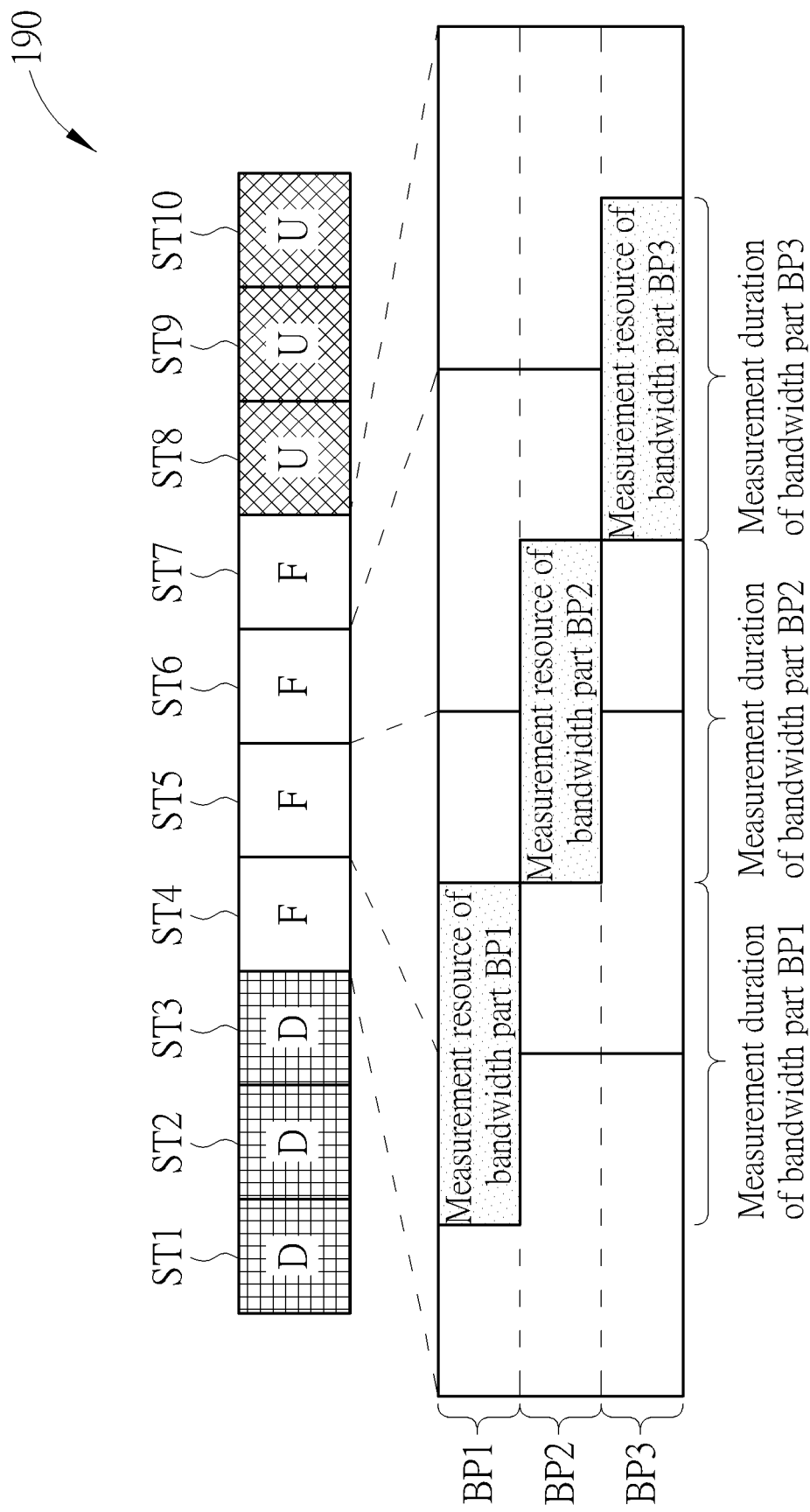
FIG. 19 is a schematic diagram of a UL/DL configuration with corresponding measurements according to an example of the present invention.

FIG. 19 is a schematic diagram of a UL/DL configuration 190 with corresponding measurements according to an example of the present invention. The UL/DL configuration 190 includes 10 slots ST1-ST10 and 3 bandwidth parts BP1-BP3, wherein each of the slots ST1-ST10 is a DL slot (denoted as D), a UL slot (denoted as U) or a flexible slot (denoted as F). A flexible slot may be (e.g., configured by a DCI as) a DL slot, a UL slot or a self-contained slot (e.g., including DL resource, UL resource and/or flexible resource). In the present example, the slots ST4-ST7 are the flexible slots.

The communication device CD1 receives information of a measurement set for the slots ST4-ST7, wherein the information includes measurement durations and measurement resources in the slots ST4-ST7 for the bandwidth parts BP1-BP3. Then, the communication device CD1 performs measurements (e.g., RSSI measurements) in the corresponding measurement resources of the slots ST4-ST7 of the bandwidth parts BP1-BP3 according to the measurement set, to obtain measurement results (e.g., RSSIs). The measurements in different bandwidth parts may be performed independently.

The operation of "determine" described above may be replaced by the operation of "compute", "calculate", "obtain", "generate", "output, "select", "use", "choose/select" or "decide". The term of "according to" described above may be replaced by "in response to". The phrase of "associated with" described above may be replaced by "of" or "corresponding to". The term of "via" described above may be replaced by "on", "in" or "at". In one example, a resource (e.g., DL resource, UL resource or flexible resource) mentioned above is an OFDM symbol, or is a slot. In one example, a resource (e.g., DL resource, UL resource or flexible resource) mentioned above includes a group of OFDM symbols, or includes a group of slots.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling a flexible duplexing. Interactions between communication devices and cells serving the communication device are defined. Thus, a CLI between the communication devices and the cells is reduced, and a transmission/reception of system information is protected. As a result, the problem regarding the flexible multiplexing is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a measurement, comprising:
    at least one storage device; and
    at least one processing circuit, coupled to the at least one storage device, wherein the at least one storage device stores, and the at least one processing circuit is configured to execute instructions of:
    receiving information of a measurement set for at least one first slot from a base station (BS), wherein the information comprises measurement timing configuration of the measurement set; and
    performing the measurement in the at least one first slot according to the measurement set, to obtain a measurement result;
    wherein the measurement timing configuration comprises a measurement duration and at least one of a periodicity, at least one second slot and at least one symbol offset;
    wherein the measurement duration comprises a plurality of layer-1 average durations.

2. The communication device of claim 1, wherein the measurement comprises a received signal strength indicator (RSSI) measurement.

3. The communication device of claim 1, wherein the measurement result comprises at least one of an average RSSI and a channel occupancy.

4. A method for handling a measurement of a communication device, comprising:
    receiving information of a measurement set for at least one first slot from a base station (BS), wherein the information comprises a measurement timing configuration of the measurement set; and
    performing the measurement in the at least one first slot according to the measurement set, to obtain a measurement result;
    wherein the measurement timing configuration comprises a measurement duration and at least one of a periodicity, at least one second slot and at least one symbol offset;
    wherein the measurement duration comprises a plurality of layer-1 average durations.

5. The method of claim 4, wherein the measurement comprises a received signal strength indicator (RSSI) measurement.

6. The method of claim 4, wherein the measurement result comprises at least one of an average RSSI and a channel occupancy.

7. The communication device of claim 1, wherein the information further comprises a measurement resource of the measurement set.

8. The communication device of claim 7, wherein the measurement resource comprises at least one bandwidth part for the measurement.

9. The communication device of claim 8, wherein the at least one bandwidth part is determined according to at least one of a system bandwidth and a higher layer signalling.

10. The communication device of claim 7, wherein the measurement resource does not overlap with any reserving resource.

11. The method of claim 4, wherein the information further comprises a measurement resource of the measurement set.

12. The method of claim 11, wherein the measurement resource comprises at least one bandwidth part for the measurement.

13. The method of claim 12, wherein the at least one bandwidth part is determined according to at least one of a system bandwidth and a higher layer signalling.

14. The method of claim 11, wherein the measurement resource does not overlap with any reserving resource.

* * * * *